Sept. 8, 1936.  C. L. PEARSON  2,053,577
CAMP STOVE AND THE LIKE
Filed July 9, 1935  2 Sheets-Sheet 1
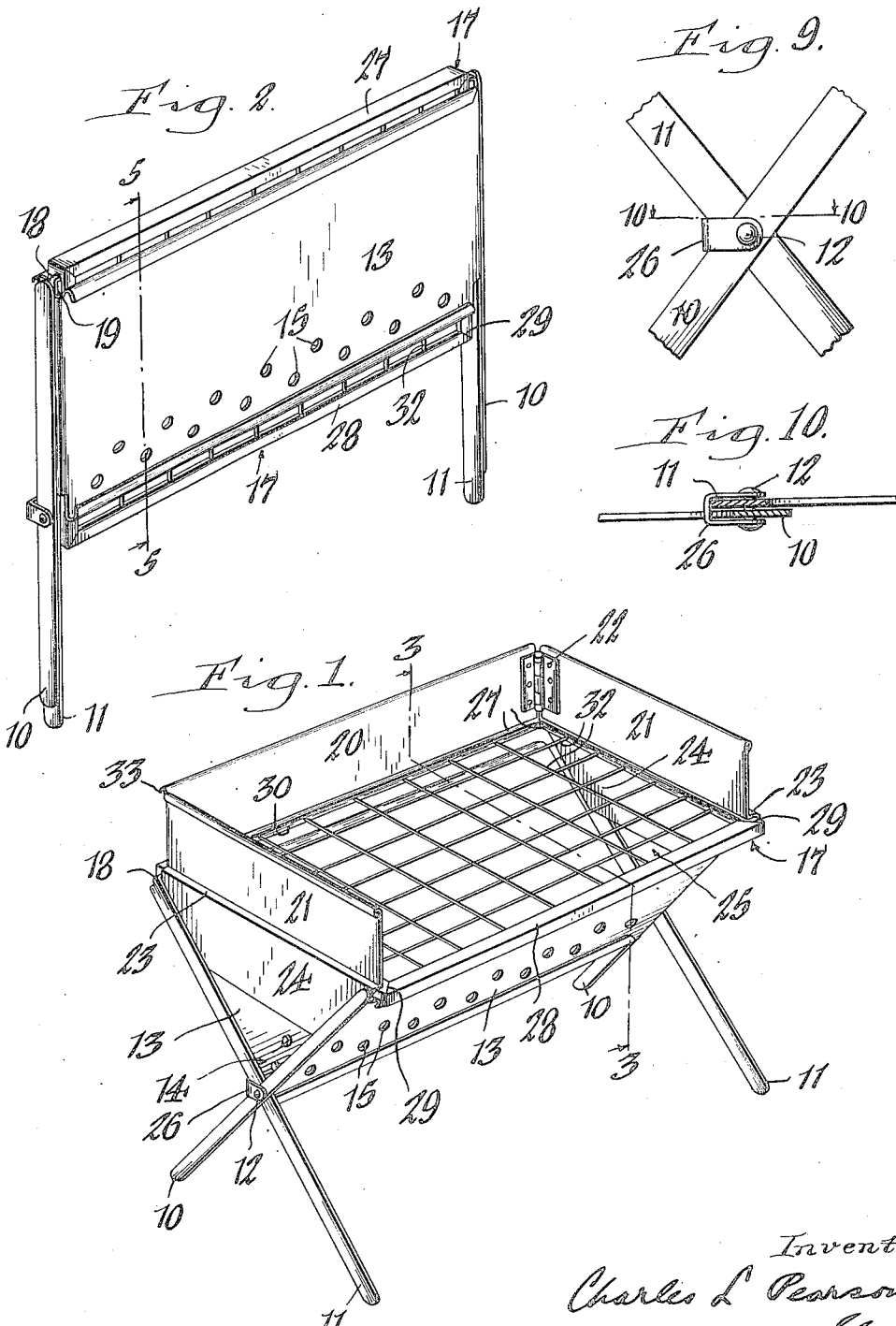
Inventor,
Charles L. Pearson,
by Walter P. Geer
Attorney.

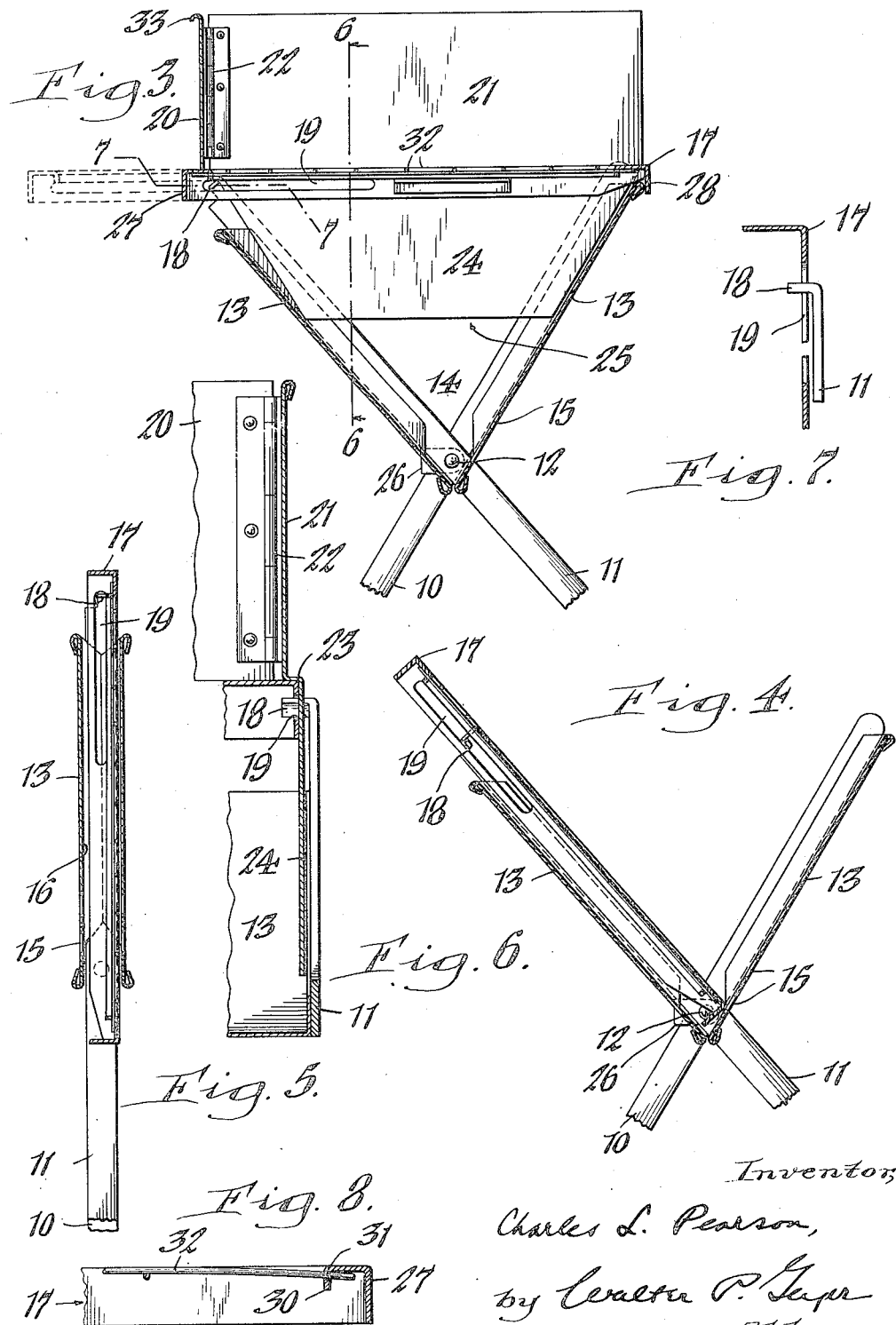

Patented Sept. 8, 1936

2,053,577

UNITED STATES PATENT OFFICE 2,053,577

CAMP STOVE AND THE LIKE

Charles L. Pearson, Buffalo, N. Y., assignor to Master Metal Products, Inc., Buffalo, N. Y., a corporation of New York Application July 9, 1935, Serial No. 30,501

5 Claims. (Cl. 126—29)

This invention relates to certain new and useful improvements in camp stoves or picnic grills.

One of its objects is the provision of a foldable picnic grill which is compact and clean to carry, and which is inexpensive.

Another object of the invention is to provide a camp stove of this character having an attachment for its top side which not only forms, in effect, a chimney to draw the heat upwardly from the fire-box toward the grill, but which also acts as a wind break to conserve or confine the heat where it is needed and prevents the heat blowing away from the grill.

Other features of the invention reside in the construction and arrangement of parts hereinafter described and particularly pointed out in the appended claims.

In the accompanying drawings:—

Figure 1 is a perspective view of my improved picnic grill in its unfolded or operative position. Figure 2 is a perspective view of the grill in its folded or collapsed position. Figure 3 is an enlarged, fragmentary transverse section taken substantially in the plane of line 3—3, Figure 1. Figure 4 is a sectional view similar to Figure 3 showing the grill in its partially folded position preparatory to collapsing the frame. Figure 5 is an enlarged cross section taken on line 5—5, Figure 2. Figure 6 is an enlarged, fragmentary, longitudinal section taken in the plane of line 6—6, Figure 3. Figure 7 is a fragmentary, horizontal section taken on line 7—7, Figure 3. Figure 8 is a fragmentary, sectional view showing the manner of assembling the grill rods or wires in the grill frame. Figure 9 is a fragmentary, end view of the foldable legs and stop element for limiting their unfolding movement. Figure 10 is a horizontal section taken on line 10—10, Figure 9.

Similar characters of reference indicate corresponding parts throughout the several views.

This improved picnic grill comprises a collapsible frame including pairs of intersecting leg members 10 and 11 which are pivoted intermediate their ends, as indicated at 12, so that these legs may assume the spread position shown in Figures 1 and 3 or the collapsed overlying position shown in Figures 2 and 5. Secured to the upper portions of the legs 10 and 11 and joining them together as a unit, are side walls or tie plates 13 which, in the unfolded position of the frame, form a trough or fire-box 14, it being noted in Figures 2 and 3 that these walls converge downwardly in the open or spread position of the legs and that they are provided adjacent their lower ends with draft openings 15. As shown in Figure 3, it will be observed that these side walls abut at their lower ends to prevent the fire falling through and are disposed substantially in a plane adjoining the outer edges of the legs, so that when the latter are folded to the position shown in Figures 2 and 5, a substantially rectangular pocket or compartment 16 is formed for a purpose which will hereinafter appear.

Adapted for disposition over the fire-box in the unfolded position of the frame 10, 11 and for insertion into the pocket 16 in the folded or collapsed position thereof, is a grill plate 17 of any suitable construction, which is connected to the upper ends of one set of companion legs, say the legs 11, so as to be capable of a combined swinging and linear movement with respect to the leg-frame. For this purpose the legs 11 are preferably provided at their upper ends with integrally-formed pivot-lugs 18 which engage corresponding longitudinal slots 19 formed in the end walls of the grill plate, as seen in Figures 3, 4 and 7. In its horizontal or operative position, the grill rests with its free end upon the upper edge of the adjoining fire-box wall 13. By mounting the grill plate in this manner, it can be readily swung to an operative position over the fire-box for roasting, broiling or cooking, or it may be swung to a position at one side of the fire-box to uncover the latter and render it accessible for introducing the charcoal or wood for making the fire. When collapsing the stove for transporting or storage purposes, the grill plate is shifted transversely of the leg-frame to the horizontal position shown by dotted lines in Figure 3, after which it is swung downwardly and inwardly into the fire-box and against the adjoining wall 13 thereof, as seen in Figure 4. While in this position, it is then allowed to slide or drop downwardly until its movement is arrested by the outer ends of the grill slots 19 abutting against the pivot-lugs 18. The legs are now folded together, as shown in Figures 2 and 5, in which position the grill plate is housed within the resulting pocket 16 with the side walls 13 constituting guard plates for preventing the greasy grill coming in contact with the clothes of the user or with the upholstery of the car in which the stove is carried.

Extending about and projecting above the grill plate is an attachment which functions as a combined windshield and chimney and which is removably mounted on the stove and is preferably so designed as to be foldable to a collapsed state when not in use. This attachment extends around one side and the opposite ends of the grill, as seen in Figure 1, and consists of a longitudinal section 20 and end sections 21, 21 which are pivotally connected to the opposing ends of the first-named section by hinges 22, whereby the end sections may be folded against the longitudinal section when detached from the stove. The longitudinal section rests edgewise at its lower edge on the top side of the grill, as seen in Figure 3, while the end sections 21 have laterally-offset flanges or shoulders 23 at their lower edges which rest upon the marginal top side and overlap the ends of the grill plate 17, as shown in Figure 6. These flanges terminate in depending portions or aprons 24 which extend into the fire-box in the manner shown in Figure 3 and which overlie the inner faces of the companion upper portions of the legs 10, 11, it being the purpose of these aprons to form closures for the ends of the fire-box. The aprons, however, terminate above the converging lower end of the fire-box so as to leave end draft passages 25 for the fire-box. By the provision of this attachment, an effective windshield is afforded which conserves the heat where wanted and distributes it uniformly over the grill and it further acts to draw the heat upwardly toward the grill. Aside from this, it can be easily applied to and removed from the stove and in the collapsed position of the latter, the attachment, when folded, can be placed in the pocket 16 with the grill.

For the purpose of limiting the opening movement of the legs 10, 11, a U-shaped clip 26 is connected at its free ends to the corresponding leg-pivot 12, while the closed end thereof constitutes an abutment or stop against which the opposing edges of the legs of a pair are adapted to bear, as seen in Figure 9.

While the grill plate 17 may be of any suitable construction it preferably consists of a rectangular frame composed of a U-shaped section 27 and a mating side section 28 adapted to be soldered or otherwise connected to the latter at the joints 29, as seen in Figure 1. These frame-sections are substantially channel-shaped in cross section, as shown in Figure 8, and their inner flanges 30 have holes 31 therein in which the ends of the grill-rods 32 are seated. The grill-rods are assembled as a unit, being welded at a plurality of intersecting points. The ends of the transverse rods are inserted in the side portion of the frame 27 as the longitudinal rods are slightly bowed for inserting their ends into the end portions of said frame, after which the jointed frame-section 28 is assembled in place with the adjoining ends of the transverse grill rods engaging its openings. By this construction, a grill plate is provided which is inexpensive and easy to assemble.

For the purpose of suspending the windshield 20, 21, when folded, from the upper edge of the collapsed stove-frame, its section 20 has a substantially hook-shaped longitudinal flange 33 which is adapted to engage the upper edge of one of the stove-walls 13.

I claim as my invention:—

1. A camp stove, comprising a frame having a fire-box and a grill plate extending over the same, and a wind-shielding member rising from said frame above and about the marginal edges of the ends and one of the sides of the grill plate, said member including a side section and end sections hingedly connected thereto, said end sections having portions extending below the grill plate and across corresponding ends of the fire-box.

2. A camp stove, comprising a frame having a fire-box and a grill plate extending over the same, and a detachable windshield rising from said frame above and about the marginal edges of the ends and one of the sides of the grill plate and having means thereon engaging said plate to prevent its lateral displacement, the end portions of the windshield extending below the grill across the corresponding ends of the fire-box.

3. A camp stove, comprising a collapsible frame including pairs of intersecting pivoted leg members and opposing side walls, forming a substantially trough-shaped fire-box, connected to the upper portions of said leg members, a grill plate extending over the fire-box, and a windshield attachment having portions extending above and about the ends and one side of the grill plate and portions extending below the latter and across the ends of the firebox.

4. A camp stove, comprising a collapsible frame including pairs of intersecting pivoted leg members and opposing side walls, forming a substantially trough-shaped fire-box, connected to the upper portions of said leg members, a grill plate extending over the fire-box, and a detachable windshield surmounting the grill plate and including a side wall and end walls hingedly connected thereto, the end walls having portions extending downwardly between the fire-box walls and constituting end-closures for the fire-box.

5. A camp stove, comprising a collapsible frame including pairs of intersecting pivoted leg members and opposing side walls, forming a substantially trough-shaped fire-box, connected to the upper portions of said leg members, a grill plate extending over the fire-box, and a detachable windshield surmounting the grill plate and including a side wall and end walls hingedly connected thereto, the end walls having laterally-offset flanges forming seats engaging the companion ends of the grill plate and depending portions extending between the fire-box walls and constituting end-closures for the fire-box.

CHARLES L. PEARSON.